United States Patent
Spühler et al.

(10) Patent No.: US 12,409,839 B2
(45) Date of Patent: Sep. 9, 2025

(54) METHOD AND CONTROL DEVICE FOR OPERATING A MOTOR VEHICLE

(71) Applicant: ZF Friedrichshafen AG, Friedrichshafen (DE)

(72) Inventors: Stefan Spühler, Markdorf (DE); Stefan Blattner, Ravensburg (DE); Stefan Bemetz, Wangen im Allgäu (DE); Dennis Wohlfahrt, Kressbronn am Bodensee (DE); Thorsten Leim, Friedrichshafen (DE); Jochen Breuer, Tettnang (DE); Mario Steinborn, Friedrichshafen (DE); Fabian Ley, Bürstadt (DE); Hannes Werner, Friedrichshafen (DE); Benjamin Berger, Markdorf (DE); Christian Mittelberger, Ravensburg (DE)

(73) Assignee: ZF Friedrichshafen AG, Friedrichshafen (CN)

( * ) Notice: Subject to any disclaimer, the term of this patent is extended or adjusted under 35 U.S.C. 154(b) by 0 days.

(21) Appl. No.: 18/666,218

(22) Filed: May 16, 2024

(65) Prior Publication Data
US 2024/0383476 A1 Nov. 21, 2024

(30) Foreign Application Priority Data
May 17, 2023 (DE) ...................... 10 2023 204 674.1

(51) Int. Cl.
*B60W 30/18* (2012.01)
*B60K 23/04* (2006.01)
(Continued)

(52) U.S. Cl.
CPC ...... *B60W 30/18145* (2013.01); *B60W 10/14* (2013.01); *B60W 10/16* (2013.01);
(Continued)

(58) Field of Classification Search
CPC ......... B60W 30/18145; B60W 30/184; B60W 10/14; B60W 10/16; B60W 10/184;
(Continued)

(56) References Cited

U.S. PATENT DOCUMENTS 11,383,599 B2 * 7/2022 Dumas .................. B60K 20/02
2002/0171288 A1 11/2002 Ahlgren
(Continued)

FOREIGN PATENT DOCUMENTS

| DE | 10 2010 030 997 A1 | 1/2012 |
| DE | 10 2014 118 407 A1 | 6/2016 |
| WO | 2004/054838 A1 | 7/2004 |

OTHER PUBLICATIONS

German Patent Office, Office Action issued in German patent application No. 10 2023 204 674.1 (Dec. 21, 2023).

*Primary Examiner* — Tinh Dang
(74) *Attorney, Agent, or Firm* — Finch & Maloney PLLC

(57) ABSTRACT

A method for operating a motor vehicle (1) having at least one driven axle (3) with a locking differential (10*a*), where when the motor vehicle (1) is driving and the locking differential (10*a*) concerned is engaged on at least one driven axle (3), it is checked whether the motor vehicle is driving round a curve. If it is found that the motor vehicle is driving round a curve, the engaged locking differential (10*a*) is actuated to disengage it and it is checked whether the locking differential (10*a*) concerned has in fact been disengaged. If it is found that the locking differential (10*a*) concerned has not been disengaged, the wheel of the driven axle (3) concerned on the outside of the curve is braked.

11 Claims, 2 Drawing Sheets

(51) Int. Cl.
  *B60T 8/1755* (2006.01)
  *B60W 10/12* (2012.01)
  *B60W 10/14* (2012.01)
  *B60W 10/16* (2012.01)
  *B60W 10/18* (2012.01)
  *B60W 10/184* (2012.01)
  *B60W 30/045* (2012.01)
  *B60W 30/184* (2012.01)
  *F16H 48/20* (2012.01)
  *B60W 10/22* (2006.01)

(52) U.S. Cl.
  CPC ........ *B60W 10/184* (2013.01); *B60W 30/184* (2013.01); *B60W 10/22* (2013.01); *B60W 2510/125* (2013.01); *B60W 2520/14* (2013.01); *B60W 2710/125* (2013.01); *B60W 2710/18* (2013.01); *B60W 2710/22* (2013.01); *B60W 2720/403* (2013.01)

(58) Field of Classification Search
  CPC .......... B60W 10/22; B60W 2510/125; B60W 2520/14; B60W 2710/125; B60W 2710/18; B60W 2710/22; B60W 2720/403; B60W 10/04; B60W 10/10; B60W 10/12; B60W 10/18; B60W 30/045; B60W 2710/223; B60T 8/1755; B60T 2201/14; B60T 2201/16; F16H 2048/204; B60K 23/04; B60K 2023/046
  See application file for complete search history.

(56) References Cited

U.S. PATENT DOCUMENTS

2011/0022279 A1* 1/2011 Povirk .................. B60K 23/04
                                                              701/68
2019/0322316 A1* 10/2019 Chennupalli .......... B60K 6/547

* cited by examiner

METHOD AND CONTROL DEVICE FOR OPERATING A MOTOR VEHICLE

RELATED APPLICATIONS

This application claims the benefit of and right of priority under 35 U.S.C. § 119 to German Patent Application no. 10 2023 204 674.1, filed on 17 May 2023, the contents of which are incorporated herein by reference in its entirety.

FIELD OF THE DISCLOSURE

The invention relates to a method for operating a motor vehicle, and to a control unit for operating a motor vehicle.

BACKGROUND

A drivetrain of a motor vehicle comprises a drive aggregate and a transmission connected between the drive aggregate and a drive output. The transmission converts rotation speeds and torques and delivers the traction force supplied by the drive aggregate to the drive output.

The transmission of a motor vehicle can include several assemblies or part-transmissions, such as a distributor transmission and a differential transmission associated with a driven axle having a locking differential. A locking differential is also known as a limited-slip differential.

Large torques can occur at the locking differential of a differential transmission. For example, while driving around a curve, large torques starting from the road can be transmitted into the locking differential, namely, when the locking differential is closed. The torques transmitted from the road into the locking differential can be much larger than torques that can be transmitted starting from the drive input side of the drive aggregate into the locking differential, so that a locking differential has to be designed to withstand the larger torques in order to avoid being damaged while driving around a curve. This can result in over-dimensioning of the locking differential, with higher costs and the need for more fitting space.

DE 10 2014 118 407 A1 discloses a method for controlling a locking differential transmission in the drivetrain of a motor vehicle. A drive torque provided by a drive aggregate in the form of an electric machine is transmitted to the locking differential transmission in order to power the driven wheels. A reaction torque of the electric machine is used to control the locking differential transmission on the basis of the reaction torque.

SUMMARY

There is a need for a method and a control unit for operating a motor vehicle, which allow the locking differential to be designed having regard to the torque coming from the drive aggregate that is to be transmitted, and this also when while driving around a curve the torques starting from the road and acting upon the locking differential are larger than the maximum torque starting from the drive aggregate that is to be transmitted by the locking differential.

Starting from there, the purpose of the present invention is to provide a new type of method and control unit for operating a motor vehicle. This objective is achieved by methods of the present disclosure and by a control unit as disclosed herein.

According to the present disclosure, when the motor vehicle is driving and the locking differential concerned is engaged with least at one driven axle, it is checked whether the motor vehicle is driving around a curve. If it is found that the vehicle is indeed driving around a curve, the locking differential engaged is actuated to disengage it and it is checked whether the locking differential concerned has in fact been disengaged. If it is found that despite having been actuated appropriately the locking differential concerned has not been disengaged, a brake is applied to the wheel of the axle concerned on the outside of the curve. In accordance with the first aspect of the invention, while driving around a curve the engaged locking differential of the driven axle concerned is actuated to disengage it. In that way, while driving around a curve unacceptably large torques are prevented from acting upon the engaged locking differential. It is possible to disengage the locking differential exclusively at the maximum drive input side torque that it is to transmit. Over-dimensioning of the locking differential can be avoided, and costs and fitting-space demand can be reduced.

Preferably, when a brake is applied to the wheel of the axle concerned which is on the outside of the curve, it is checked whether the locking differential has in fact been disengaged. If it is found that, despite the braking, the locking differential concerned has not been disengaged, then the load is reduced at a drive aggregate of the motor vehicle and/or a speed of the motor vehicle is reduced by braking.

Preferably, in order to shift the axle load from the driven axle with the engaged locking differential to the driven axle with the disengaged locking differential, at the driven axle with the engaged locking differential an air pressure of an air suspension is reduced whereas at the driven axle with the disengaged locking differential an air pressure of the air suspension is increased. In that way the axle load shift can take place particularly advantageously.

Particularly advantageously, the first aspect of the invention and the second aspect of the invention can be combined with one another. Thus, it is possible, in the sense of the second aspect of the invention, first to shift an axle load from a driven axle with the locking differential engaged to a driven axle with the locking differential disengaged, and if necessary, then to actuate the engaged locking differential so as to disengage it.

The above-described method can also be used in a motor vehicle having several driven axles, in which at least one of the driven axles has a locking differential while at least one other axle is made without a locking differential. In that case, when driving around a curve the axle load on the driven axle with the locking differential engaged can be reduced and an axle load can be imposed on the driven axle with no locking differential. Then, while the motor vehicle is driving, it can be checked whether the motor vehicle is driving around a curve. If it is found that it is driving around a curve and if the locking differential is engaged on a driven axle, the axle load is reduced on the driven axle with the engaged locking differential and an axle load can be imposed on the driven axle with no locking differential. Accordingly, when the motor vehicle has several driven axles, in order to protect an engaged locking differential of a driven axle, the axle load on the axle with the engaged locking differential is reduced and an axle load is imposed on a driven axle with no locking differential. In this way too, a locking differential can be protected against overloading and disengaged with regard to the torque to be transmitted on the drive input side. This reduces the fitting space required and the costs.

The control unit is designed to carry out the methods according to the invention by control means.

BRIEF DESCRIPTION OF THE DRAWINGS

Preferred further developments emerge from the figures and from the description given below. Example embodi

DETAILED DESCRIPTION

Figure 1:
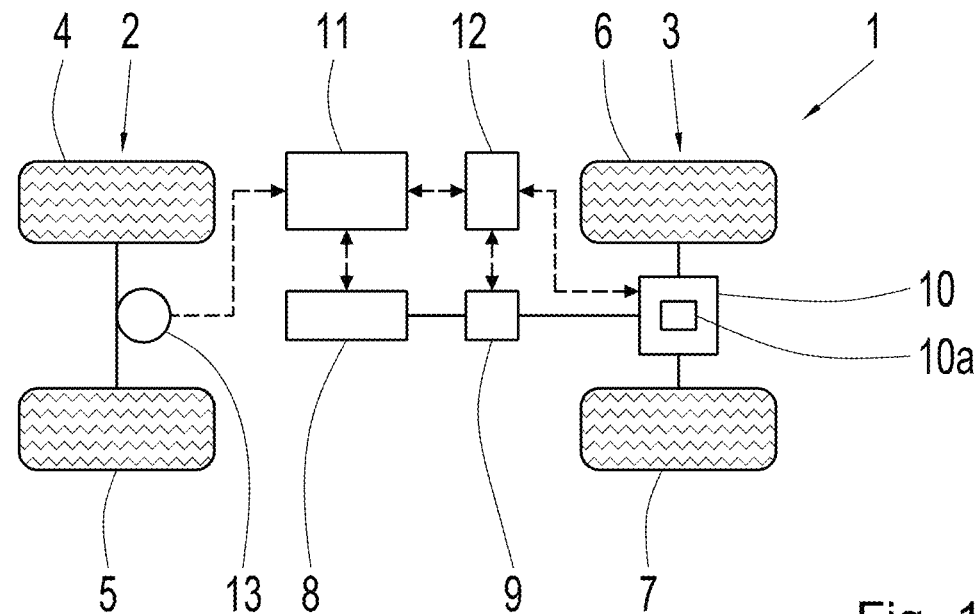
- FIG. 1: A block circuit diagram of a first drivetrain of a motor vehicle.

FIG. 1 shows a drivetrain scheme of a motor vehicle 1, wherein the motor vehicle comprises a first axle 2 and a second axle 3. In FIG. 1 the first axle 2 is a non-driven front axle with non-driven wheels 4, 5 and the second axle 3 is a driven axle with driven wheels 6, 7. FIG. 1 also shows a drive aggregate 8, which delivers drive power to the driven axle 3, namely the driven wheels 6, 7 of that axle, by way of a transmission which in FIG. 1 comprises a distributor transmission 9 and a differential transmission 10. The differential transmission 10 comprises a locking differential 10a. The locking differential 10a is also known as a differential lock.

The drive aggregate 8 is preferably an electric machine. The electric machine can be integrated in the axle 3. In that case, the distributor transmission 9 is preferably omitted.

FIG. 1 also shows a motor control unit 11 for controlling and/or regulating the operation of the drive aggregate, and a transmission control unit 12 for controlling and/or regulating the operation of the transmission, namely in FIG. 1 for controlling and/or regulating the operation of the distributor transmission 9 and the differential transmission 10.

The motor control unit 11 exchanges data with the drive aggregate 8, and the transmission control unit 12 exchanges data with the distributor transmission 9 and the differential transmission 10. In addition, the motor control unit 11 and the transmission control unit 12 exchange data with one another.

When the motor vehicle 1 of FIG. 1 is driving and the locking differential 10a is engaged on the driven axle 3, it is checked whether the motor vehicle is driving around a curve. Thus. FIG. 1 shows that the non-driven front axle 2 is associated with a steering angle sensor 13 by means of which it can be detected whether the motor vehicle is being operated to drive around a curve. A steering angle sensor 13 ca also be associated with a driven axle.

If it is found that the vehicle is driving around a curve, the engaged locking differential 10a of the driven axle 3 is actuated to disengage it. This is done in particular by the transmission control unit 12.

When the engaged locking differential 10a is actuated to disengage it, it is checked whether the locking differential 10a has actually been disengaged. This can be done, for example, by means of a switch built into the locking differential 10a, such as a plunger switch.

If it is found that the locking differential 10a which was actuated to disengage it has not been disengaged, then braking is applied to the wheel of the driven axle 3 concerned which is on the outside of the curve. By virtue of such braking on the wheel of the driven axle 3 concerned which is on the outside of the curve, stress on the locking differential concerned can be relieved.

When the wheel of the driven axle 3 which is on the outside of the curve is braked, a check is again carried out to see whether the locking differential 10a actuated to disengage it has actually been disengaged.

If it is found that, despite the braking of the wheel of the driven axle 3 which is on the outside of the curve, the locking differential 10a has not been disengaged, then load is reduced at the drive aggregate 8 of the motor vehicle and/or the speed of the motor vehicle 1 is reduced by braking. In that way the locking differential 10a, which could not be disengaged despite the braking of the wheel on the outside of the curve, can be protected against overloading and hence damage.

With reference to the signal flow diagram shown in FIG. 3, further details of the above-described method will now be explained.

Figure 3:
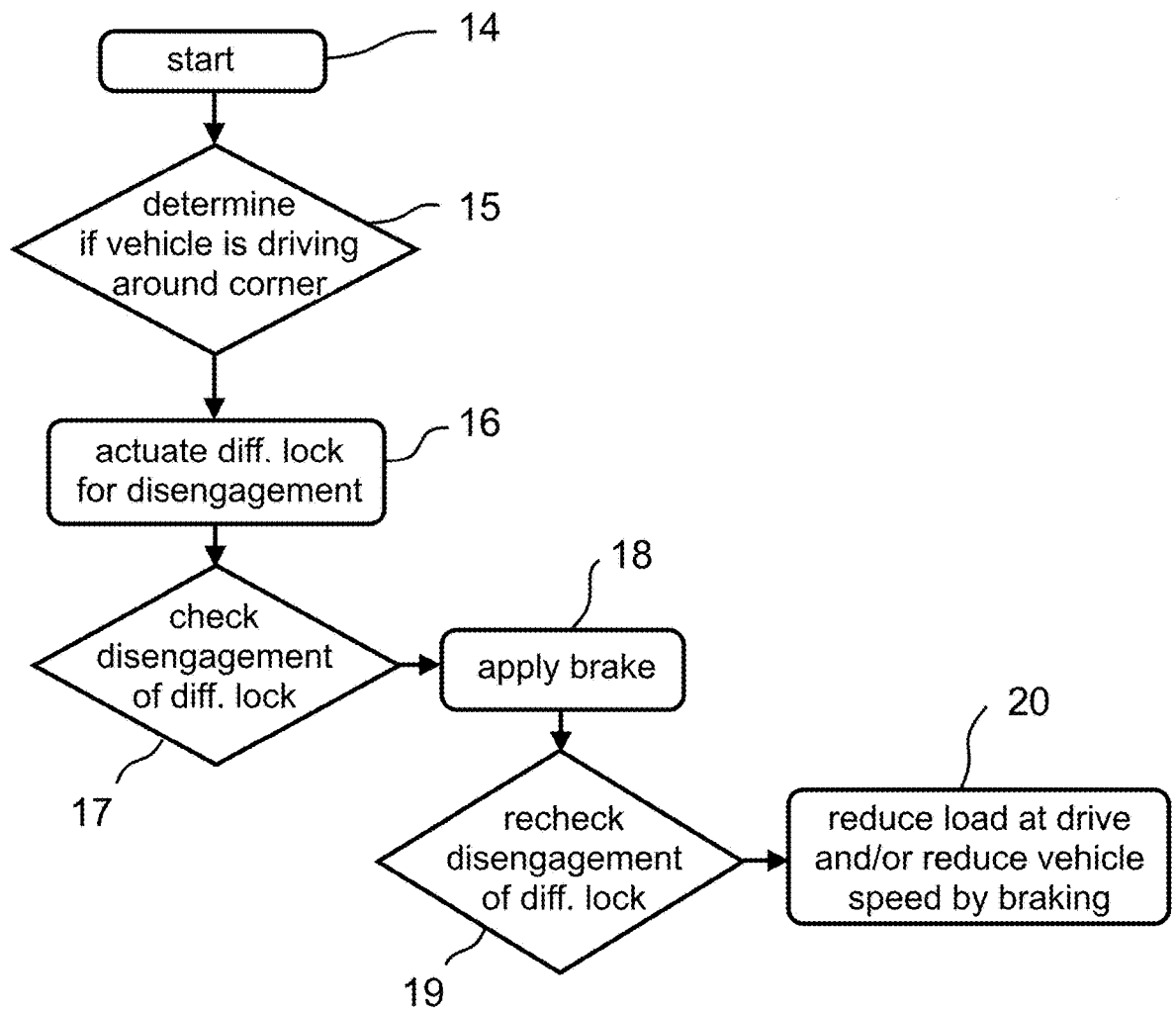
FIG. 3: A signal flow diagram to clarify the invention.

A block 14 in FIG. 3 represents a starting condition of the method, in which the motor vehicle 1 is driving and the respective locking differential 10a is engaged on the driven axle 3 concerned.

In block 15 it is checked whether the vehicle is driving around a curve. Driving around a curve can in particular be recognized or concluded on the basis of the measurement signal from the steering angle sensor 13 described in connection with FIG. 1. The steering angle sensor I can be associated with a driven axle or a non-driven axle.

Alternatively, wheel rotation speeds of the wheels of an axle can be evaluated, on which axle a locking differential is not engaged. If the wheel rotation speeds of an axle with its locking differential disengaged are different, it can be concluded that the vehicle is driving around a curve.

Driving around a curve can also be concluded on the basis of route data such as GPS data.

If in block 15 it is found that the vehicle is driving around a curve, in block 15 it can also be checked whether while driving around the curve the axle load acting upon the engaged locking differential 10a of the driven axle 3 is larger than a limit value. However, that check is preferably optional. An axle load can be determined as a function of the steering angle and/or as a function of a driving speed and/or as a function of the mass of the vehicle.

If in block 15 it is found that the vehicle is indeed driving around a curve, and if in the optional check in block 15 it is found that the axle load acting upon the driven axle 3 while driving around the curve is larger than a limit value, then in accordance with block 16 the closed locking differential 10a on the axle 3 concerned is actuated to disengage it. This can be done by reducing a control pressure, for example a pneumatic control pressure that keeps the locking differential 10a closed, so that the locking differential 10a is then disengaged by a spring element.

In the next block 17 it is checked whether the locking differential 10a that was actuated to disengage it has actually been disengaged. This can be done in particular by evaluating a signal emitted by a plunger switch of the locking differential 10a. If in block 17 it is found that the locking differential 10a actuated to disengage it has not in fact been disengaged, then the process branches off from block 17 to block 18 and then, in block 18, the wheel on the outside of the curve on the axle 3 concerned, which has the jammed locking differential 10a, is braked by applying the brake in order to relieve the stress on the locking differential 10a and to disengage the locking differential 10a actuated for the purpose of disengaging it.

In the next block 19 it is checked whether as a result of the braking of the wheel of the driven axle 3 on the outside of the curve, which axle had the engaged and previously jammed locking differential 10a, the locking differential 10a has now been disengaged. If it is found that despite the braking of the wheel on the outside of the curve the locking differential 10a concerned has not been disengaged, then the process advances from block 19 to block 20 in which load is reduced at the drive aggregate 8 and/or the speed of the motor vehicle 1 is reduced by braking. In particular, in block 20 the motor vehicle I can be braked to a standstill.

The brake application to be carried out in block 18 on the wheel on the outside of the curve of the driven axle 3 concerned can take place in such manner that first, a braking torque on the wheel on the outside of the curve is increased to a pre-control value, step-wise or with a first gradient which is larger than a threshold value, and after this the braking torque on the wheel on the outside of the curve is braked with a braking torque having a gradient that is smaller that the threshold value. Furthermore, the braking torque can be limited to a maximum value. In that way, it is possible, by means of a brake application on the wheel of the driven axle 3 concerned on the outside of the curve, to relieve the stress on the locking differential 10a concerned, quickly and without compromising driving safety.

Figure 2:
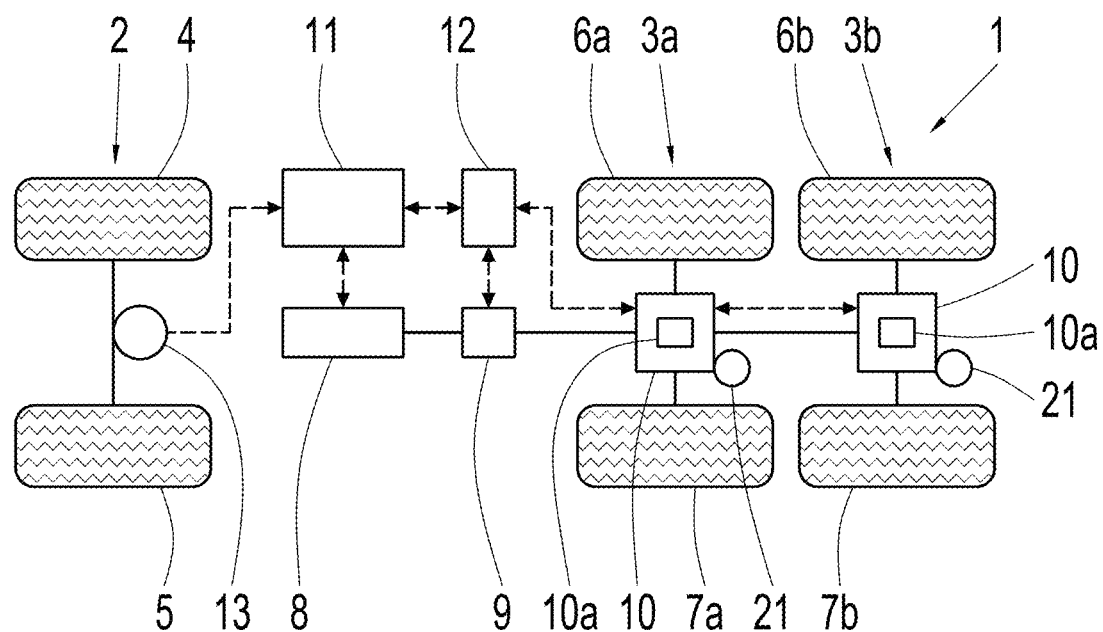
FIG. 2: A block circuit diagram of a second drivetrain of a motor vehicle.

FIG. 2 shows a very schematic representation of a drivetrain scheme of a motor vehicle 1, which has three axles 2, 3a, 3b, the axle 2 again being a non-driven front axle while the axles 3a. 3b are driven rear axles. The method described with reference to FIG. 1 can also be used with the motor vehicle 1 of FIG. 2. Furthermore, the method described with reference to FIG. 1 and described in what follows with reference to FIG. 2 can be used when all the axles 2, 3a, 3b of the motor vehicle I concerned are driven.

Referring to FIG. 2, a further method is described which can be used in combination with the method described with reference to FIG. 1, but also on its own. The method described below with reference to FIG. 2 assumes a motor vehicle with a plurality of driven axles. Thus, in FIG. 2 the axles 3a, 3b are driven. In this case both of the axles 3a, 3b have a locking differential 10a. It is assumed that the motor vehicle 1 in FIG. 2 is driving around a curve, and that while driving around the curve the locking differential 10a on a first axle 3a is engaged while on a second axle 3b the locking differential 10a is disengaged. In this case, on the driven axle 3a with the engaged locking differential 10a the axle load is reduced and on the driven axle 3b with the disengaged locking differential 10a the axle load is increased. The method described with reference to FIG. 2 can likewise be used in a motor vehicle with a plurality of driven axles 3a, 3b, in which at least one of the driven axles 3a has a locking differential 10a whereas at least one of the driven axles 3b is made without a locking differential. In such a case, while driving around a curve the axle load can be reduced on the driven axle 3a with the engaged locking differential 10a, and on the driven axle without a locking differential the axle load can be increased.

Preferably, this can be done on the driven axle with an engaged locking differential 10a by reducing an air pressure or air-suspension bellows pressure of an air suspension 21, and on the driven axle with no locking differential by increasing an air pressure or air-suspension bellows pressure of the air suspension 21. In this way too, the engaged locking differential 10a can be protected against overload while driving around a curve.

Once the axle load shift has taken place, while driving around a curve the method described in connection with FIGS. 1 and 3 can be used in order then to actuate the engaged locking differential 10a so as to disengage it.

The invention also relates to a control unit, which is designed to carry out the above-described method on by control means. This control unit is in particular the transmission control unit 12. The control unit comprises hardware means and software means for carrying out the method according to the invention. The hardware means consist of a processor for data processing, a memory for data storage and a data interface for exchanging data with the assemblies involved in carrying out the method, such as the differential transmission 10 and the locking differential 10a, as well as the steering angle sensor 13. The software means consist of program modules which are implemented in the control unit for carrying out the method according to the invention.

The invention makes it possible to provide a locking differential 10a and thus a differential transmission 10 which takes up little fitting space and is not costly. A locking differential 10a and hence a differential transmission 10 can be designed exclusively having regard to the maximum drive torque from the drive aggregate 8 to be transmitted by way of the locking differential 10a. Starting from a torque introduced by a road, while driving around a curve, for the disengagement of the locking differential 10a and hence of the differential transmission, these can be disregarded.

INDEXES

1 Motor vehicle
2 First axle
3 Second axle
3a Second axle
3b Second axle
4 Wheel
5 Wheel
6 Wheel
6a Wheel
6b Wheel
7 Wheel
7a Wheel
7b Wheel
8 Drive aggregate
9 Distributor transmission
10 Differential transmission
10a Locking differential
11 Motor control unit
12 Transmission control unit
13 Steering angle sensor
14 Block
15 Block
16 Block
17 Block
18 Block
19 Block
Block
21 Air suspension

The invention claimed is:

1. A method for operating a motor vehicle having at least one driven axle with a locking differential, the method comprising:
   determining, while the motor vehicle is driving, that the motor vehicle is driving around a curve;
   determining that a respective locking differential is engaged on at least one driven axle;
   actuating the locking differential concerned for the purpose of disengaging the locking differential;
   determining, despite actuating the locking differential that the locking differential concerned has not been disengaged; and
   braking a wheel on the outside of the curve on the driven axle concerned.

2. The method according to claim 1, comprising:
checking whether the locking differential concerned has been disengaged after braking the wheel on the outside of the curve on the driven axle concerned;
determining, despite the braking of the wheel on the outside of the curve, that the locking differential concerned has not been disengaged; and
reducing a load at a drive aggregate of the motor vehicle and/or reducing a speed of the motor vehicle by braking.

3. The method according to claim 2, comprising:
determining, despite braking of the wheel on the outside of the curve, that the locking differential concerned has not been disengaged; and
braking the motor vehicle to a standstill.

4. The method according to claim 1, wherein braking the wheel of the driven axle concerned, which wheel is on the outside of the curve, is carried out in such manner that first a braking torque is increased step-wise or with a first gradient which is greater than a threshold value up to a pre-control value, and then the braking torque is increased with a second gradient which is smaller than the threshold value.

5. The method according to claim 4, wherein braking the wheel of the driven axle concerned, which wheel is on the outside of the curve, is carried out in such manner that the braking torque is limited.

6. The method according to claim 1, comprising:
determining that an axle load on the driven axle concerned is larger than a limit value; and
actuating, while driving around a curve, the locking differential concerned to disengage the locking differential.

7. A method for operating a motor vehicle having a plurality of driven axles each with a locking differential, the method comprising:
determining, while the motor vehicle is driving, that the motor vehicle is driving around a curve;
determining that the associated locking differential is engaged on a driven axle of the plurality of driven axles;
determining that the locking differential is disengaged on another driven axle of the plurality of driven axles;
reducing the axle load on the driven axle with the engaged locking differential; and
increasing the axle load while on the other driven axle with the disengaged locking differential.

8. The method according to claim 7, comprising:
reducing an air pressure of an air suspension at the driven axle with the engaged locking differential; and
increasing an air pressure at the other driven axle with the disengaged locking differential.

9. The method according to claim 7, wherein
determining that a shift in the axle load from the driven axle with the engaged locking differential to the other driven axle with the disengaged locking differential does not or cannot take place to a required extent;
determining, while the motor vehicle is driving, that the motor vehicle is driving around a curve;
determining that a respective locking differential is engaged on at least one driven axle;
actuating the locking differential concerned for the purpose of disengaging the locking differential;
determining, despite actuating the locking differential, that the locking differential concerned has not been disengaged; and
braking a wheel on the outside of the curve on the driven axle concerned.

10. A method for operating a motor vehicle having a plurality of driven axles, wherein at least one of the driven axles has a locking differential and at least one other of the driven axles is made without a locking differential, the method comprising:
determining, while the motor vehicle is driving, that the motor vehicle is driving around a curve, and
determining that the locking differential concerned is engaged on a driven axle;
reducing an axle load at the at least one of the driven axles with the engaged locking differential; and
increasing an axle load at the at least one other of the driven axles without the locking differential.

11. A control unit of a vehicle, the control unit configured to carry out the method according to claim 1.

* * * * *